UNITED STATES PATENT OFFICE.

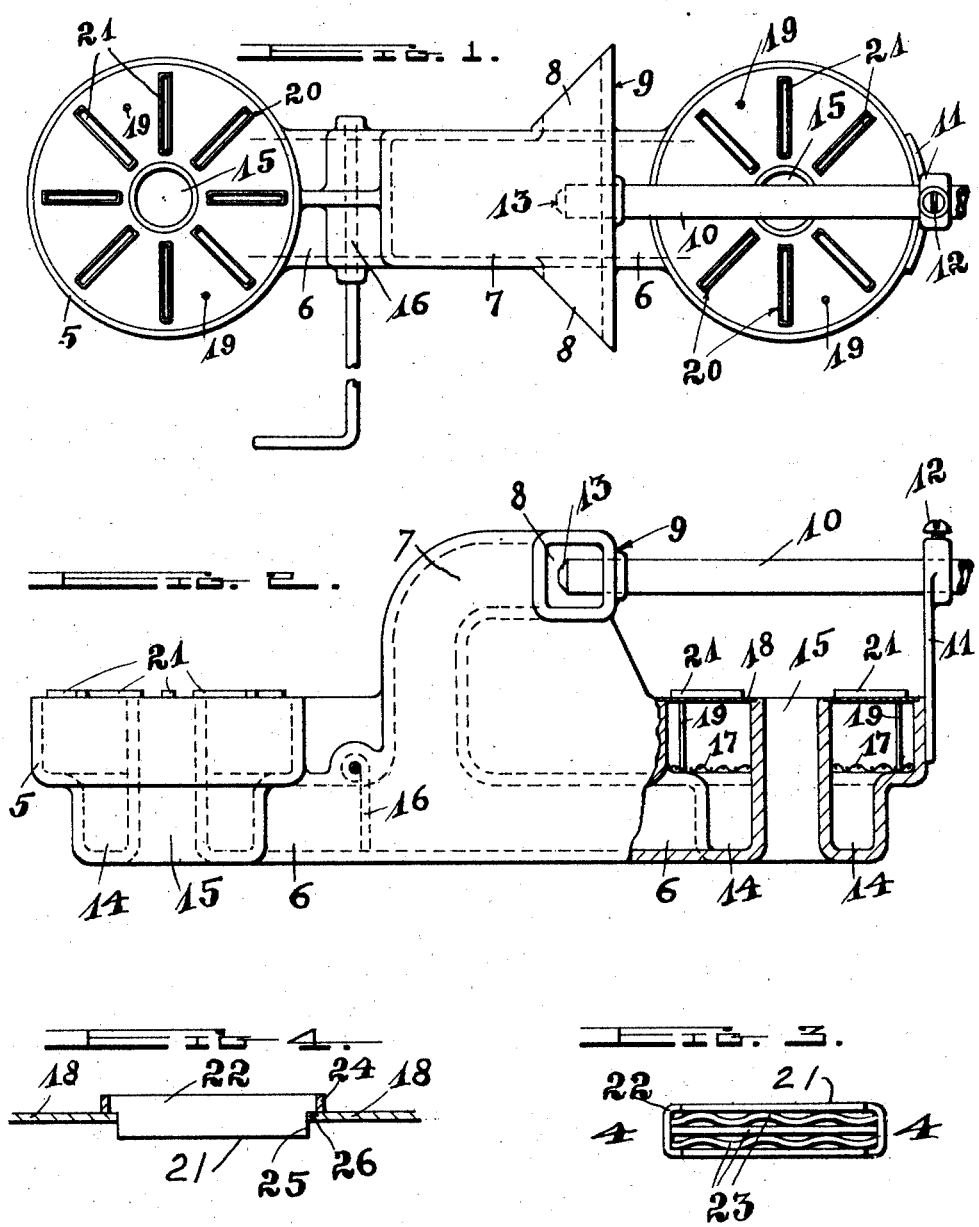

HERMAN F. RICHTER, OF LOS ANGELES, CALIFORNIA.

HYDROCARBON-BURNER.

1,388,604.  Specification of Letters Patent.  Patented Aug. 23, 1921.

Application filed April 16, 1919. Serial No. 290,627.

*To all whom it may concern:*

Be it known that I, HERMAN F. RICHTER, a citizen of the United States, residing at Los Angeles, in the county of Los Angeles and State of California, have invented a new and useful Hydrocarbon-Burner, of which the following is a specification.

This invention relates to devices for spraying, evaporating, gasifying, or otherwise feeding hydro-carbon fuel into a fire or heating place.

One object of the invention is to provide a device which will most effectively prevent the gasified fuel from condensing within the device before it is discharged out of the burner orifices.

Another object is to provide a peculiarly constructed device which has a chamber practically in the middle of the device for gasifying, mixing, and preheating the inpassing fuel and air.

Another object is to provide a preheating compartment for the inpassing within the device at a point before the air mixes with the preheated fuel.

Another object is to provide a retort for the inpassing fuel leading into the mixing chamber of the device at a point before the fuel is mixed with the inpassing air.

Another object is to provide a suitable number of superheating compartments for the gas mixture at a point before the gas is discharged out of the device.

Another object is to provide distributing baffle plates within the burners between the mixing chamber and the discharge openings.

Another object is to provide an exchangeable burner top plate in each of the burner tops, with a suitable number of openings.

Another object is to provide exchangeable aperture members which allow a changing from coarser to finer openings and a changing in the opposite manner without changing anything on the device and which allow an exchanging of such aperture members when burned out or otherwise make an exchanging necessary.

Other objects will appear from the following description and appended claims as well as from the accompanying drawing, in which—

Figure 1 is a top plan view of the device.

Fig. 2 is a side elevation of the device, partly shown in midsection to illustrate the communicating conduits, superheating compartment, and other detail constructions of the device.

Fig. 3 is a bottom plan view of an improved aperture member with several members forming the orifices of the device.

Fig. 4 is a longitudinal section through the outer casing of the aperture member in Fig. 3 on line 4—4.

In Figs. 1 and 2, 5 designates burner heads having communication with each other by the conduit 6. A preheating box 7 is provided between the burner heads and just above the communicating conduit 6. This preheating box 7 is in its upper part preferably provided with side extension ends 8 forming a heating wall 9 alongside of one of the burner heads. Such heating wall naturally serves also as a baffle for preventing the heat from such burner head of cutting off the entrance of fresh air into the preheating box. The peculiar shape of the entrance or side extension ends 8 can clearly be noticed in Fig. 1, the wall 8 preventing the heat from the burner head from striking past the entrance in such a manner that the air perhaps could not enter and also forming sufficient or suitable heating surface for the inpassing air to strike along this surface. When the whole burner, that is the several burner heads, are in operation or burning, the whole box 7 between the burner heads is naturally sufficiently heated for such preheating of the inpassing air, as will easily be understood. The preheating box 7 naturally is in communication with the conduit 6 and thereby with the burner heads 5.

A fuel supply tube 10 is adjustably held within the bracket 11 to be set lengthwise and held so in any adjusted position by the set screw 12. Such adjusting allows the advancing or retarding of the discharge end 13 of the supply tube 10 in relation to its position within the preheating and mixing box 7. This fuel supply tube forms the retort of the device by being located above one of the burner heads, thus properly heating the passing fuel.

The discharging from the retort into the box 7 that is into the preheated air passing through this box, naturally produces a good evaporating and mixing of the fuel with the air thereby forming a desired gas mixture.

Superheating compartments or chambers 14 are provided within the burner heads 5.

The gas mixture obtained within the preheating box 7 passes through these superheating chambers 14 before it is discharged out of the burner heads.

Passages 15 are provided through the burner heads of suitable proportion to comingle with the superheated gas mixture, above the burner heads, to such an extent as to give the desired heat and flame.

A throttle valve 16 is provided within the conduit 6 so as to allow a controlling of the several burner heads, in the drawing only two such heads being shown, but it will easily be understood that any suitable number of heads may be connected. In case of more heads than two heads being provided in a complete device, naturally a suitable number of such throttle valves must be provided to allow a controlling of the several burner heads.

A screen 17 is provided within each of the burner heads serving to distribute and promoting the evaporation of the fuel when passing through the burner heads.

At the top of the burner heads suitable top plates 18 are disposed, held in position by the bolts 19. The plates 18 are provided with suitable orifices 20 into which the insets 21 are disposed. The insets 21 can easily be exchanged when worn out or oxidized, as will more easily be understood from the illustrations in Figs. 3 and 4. Such insets may be of a single piece or casing as illustrated in Fig. 1, but more preferably consist of the casing 22, and the straight or corrugated pieces or members 23. Such arrangement allows an adjusting of the apertures between the several members 23 and the casing 22, as will easily be understood. Using just the casing would give a real big opening, placing one corrugated member pressfit into the casing naturally reduces such opening within the casing 22, and placing any other suitable number of pieces 23 within the casing 22 naturally allows a forming of apertures between the several pieces suitable for the condition in different burners, as will easily be understood without any further illustration.

Such easily engaging of the casing within the orifices of the top plate 18 and such easily engaging of the several pieces or members 23 allows an easily exchanging of these insets when worn out, or oxidized, or otherwise the condition requires so. To assure a proper placing and exchanging of these insets, I prefer to provide the casing with the upper portion 24 resting on the top plate 18 by having a suitable portion 25 cut off at the ends of the casing so as to form a shoulder 26, which comes to rest on the top surface of the top plate 18, the upper remaining portion 24 of the casing always bringing the top surface or top edge of the casing 22 and thereby of the insets a suitable distance above the top surface of the top plate 18. This has many advantages, for instance, preventing the top plate from overheating (in this case, the flame not even touching the top surface of the top plate); maintaining the same distance above the mixing and evaporating point within the burner heads above the screen 17; allowing the exchanging of one inset while the others may be in good shape, so retaining the same top plate, and retaining the other insets; also allowing an exchanging of the top plate 18 while the insets may still be used in the new top plate; and other similar exchanging.

Having thus described my invention, I claim:

1. In a burner of the class described, burner heads having an intercommunicating conduit, a mixing box extending upwardly from the conduit to a suitable point above the top of the burner heads having a curved portion projecting toward one of the burner heads opening sidewise, the closed side of the upper termination of the mixing box nearest the burner head toward which it projects being of greater width than the mixing box proper forming a preheating partition and adapted for keeping the ingoing cool air away from this burner head, and a supply tube disposed over such last-named burner head projecting through said enlarged preheating partition in the closed end of the said box terminating within the box at a point intermediate the side openings in the box.

2. In a burner of the class described, burner heads having an intercommunicating conduit, a mixing box and a supply tube disposed over one of the burner heads terminating within said box, the box being of practically even width with the communicating conduit between the burner heads having communication with the conduit and projecting upwardly to a point above and curved to a point near one of the burner heads, the curved portion of the box being connected with the conduit and partly with the adjacent burner head thereby forming an open heating box between the said curved portion of the box and such last-named burner heads.

3. In a burner of the class described, a supply tube, burner heads having an intercommunicating conduit, and a preheating and mixing box having a conduit-portion and an open portion, the conduit-portion of the box having communication with the conduit of the burner heads being of a curved form extending upwardly and terminating in a sidewise direction near and above one of the burner heads with side intake openings, the open preheating portion being formed by ribs connecting the curved portion and the last-named burner heads and below the intake end of the curved-portion, the supply tube projecting into and terminating within the intake end of the conduit portion of the said box.

In testimony that I claim the foregoing as my invention I have signed my name in the presence of two subscribing witnesses.

HERMAN F. RICHTER.

Witnesses:
ROBERT LIST,
ETHEL E. LE GORE.